G. L. MILLER.
ATTACHMENT FOR CULTIVATORS.
APPLICATION FILED SEPT. 3, 1915.
1,166,144.
Patented Dec. 28, 1915.
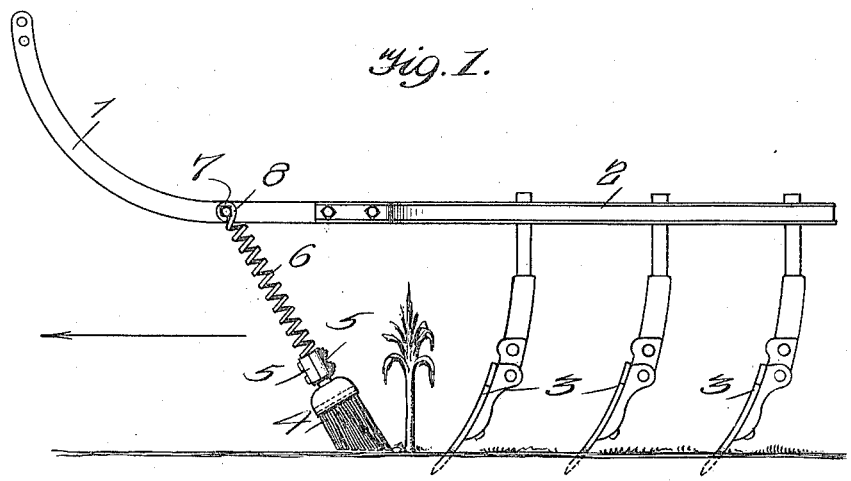
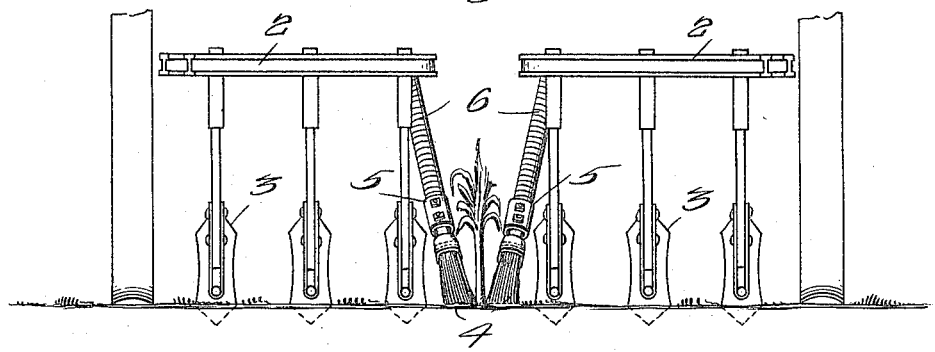
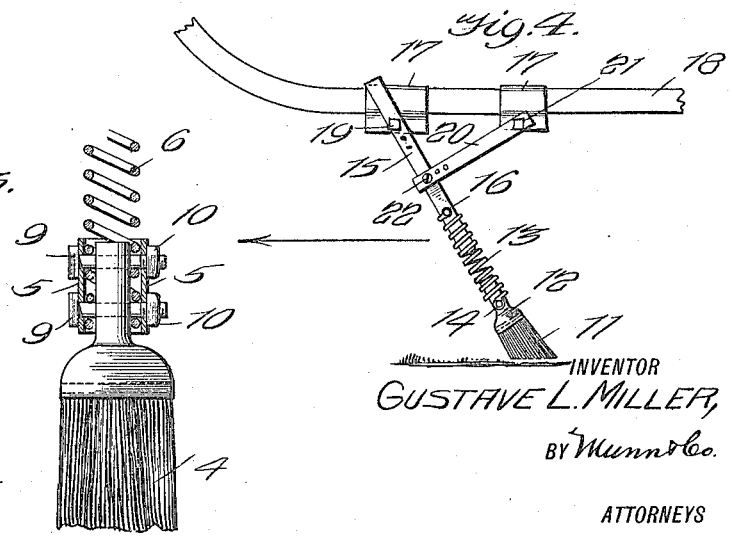
WITNESSES:
INVENTOR
GUSTAVE L. MILLER,
BY Munn & Co.
ATTORNEYS

UNITED STATES PATENT OFFICE.

GUSTAVE L. MILLER, OF GENESEO, ILLINOIS.

ATTACHMENT FOR CULTIVATORS.

1,166,144. Specification of Letters Patent. Patented Dec. 28, 1915.

Application filed September 3, 1915. Serial No. 48,796.

*To all whom it may concern:*

Be it known that I, GUSTAVE L. MILLER, a citizen of the United States, and a resident of Geneseo, in the county of Henry and State of Illinois, have invented certain new and useful Improvements in Attachments for Cultivators, of which the following is a specification.

My invention is an improvement in attachments for cultivators, and the invention has for its object to provide mechanism of the character specified, especially designed to destroy and eradicate weeds growing close to the stalk in the row which are not reached by the shovels of the cultivator.

In the drawings: Figure 1 is a side view of a cultivator provided with the improvement; Fig. 2 is a partial rear view; Fig. 3 is an enlarged section through one of the brushes, showing the manner of connecting the same, and Fig. 4 is a side view of a modified construction.

The present embodiment of the invention is shown in connection with a cultivator, the said cultivator having beams 1, to which are connected the plow supporting frames 2, and the plows 3 of ordinary construction are connected with the frames.

The improved attachment comprises a pair of brooms, brushes or sweeps 4, each of the said brooms, brushes or sweeps being composed of a bunch of broom corn or the like, and the bunch is clamped in the clamp shown more particularly in Fig. 3.

The clamp consists of similar bent sections 5, which are adapted to fit around the upper end of the broom loosely, and the said upper end is clamped to a coil spring 6 at one end of the spring. This spring 6 is secured to each beam 1 of the cultivator, by means of a bolt and nut 7 which is passed through an eye 8 in the upper end of the spring, and the clamping sections 5 are at the lower end of the spring.

The upper end of the broom 4 is inserted in the lower end of the spring 6, as shown in Fig. 3, and two bolts 9 are passed through registering openings in the sections and through the broom, and the bolts are engaged by nuts 10. The bolts and nuts clamp the sections on the spring and clamp the spring on the broom, so that the broom is held firmly in place.

The brooms are arranged as shown in Fig. 2, with the springs 6 inclining inwardly, rearwardly and downwardly, in such manner that the free ends of the brooms will almost touch the ground when the plows are in the ground on each side of the plants in the row, and the said free ends will brush the ground at the point where the plant leaves the ground.

The springs 6 are of sufficient strength to hold the brooms normally in this position, but the springs may yield to prevent damage to the broom or spring from obstructions or the like.

It will be evident that the brooms will remove any weeds that may be at the roots of the plants. In addition, because of the manner in which they are inclined, the brushes tend to sweep the weeds away from the plants, and outwardly and downwardly into such position that they will be covered by the dirt thrown by the shovel.

In Fig. 4 is shown a modified construction, wherein the broom 11 has a handle portion 12 which is inserted in the lower end of a coil spring 13, and a bolt or rivet 14 is passed through an eye in the end of the spring and through the handle portion 12, to secure the broom to the spring.

The upper end of the coil spring 13 fits over the lower end of a bar 15 and a second rivet 16 is passed through an eye in the adjacent end of the spring and through the bar to secure the spring to the bar.

A pair of U-shaped clips 17 is arranged on each beam 18, and the upper end of the bar 15 is connected to one of the clips below the beam by a bolt and nut 19. An inclined brace 20 is arranged between the bar 15 and the other clip 17, the said brace being secured to the clip by a bolt and nut 21 at one end of the brace and to the bar 15 at the other end of the brace by means of a bolt 22.

The bolts 19 are below the beam, and these bolts clamp the clips on the beam, and at the same time connect the bar 15 and the brace 20 to the beam. By loosening the nuts of the bolts 20, the clips 17 may be adjusted longitudinally of the beam. In addition, the beam 15 and the brace 20 each have at one end a series of openings for receiving the bolts 19 and 22, to permit adjustment of the inclination of the bar 15 with respect to the beam.

It will be understood that the brush 11 is arranged in the same manner as the brushes 4 of Figs. 1 and 2, and acts in the same manner.

The brooms or sweeps 4 are shaped like a whisk broom, being flattened, and the flat surface of the broom is turned outward. This arrangement insures the effective operation of the brushes, the flat faces of the brooms or sweeps carrying the weeds away from the corn stalks and leaving the weeds in position to be covered by the shovels.

The free ends of the brooms do not quite touch the ground, and the inner corners of the brooms touch each other, as shown, opening or separating as they strike the stalks of corn. Thus the brooms or sweeps brush and turn the weeds out and down, so that they are covered by the earth thrown by the shovels.

The springs yield to permit the brooms to brush by the corn stalks without injuring the same, yet the said springs retain the faces of the brooms turned outwardly and downwardly to operate effectively.

The sweeps or brooms are not used until the corn has reached a height of approximately 12 to 15 inches, at which time the stalks are of sufficient strength to resist being carried to the ground by the brooms or sweeps, while the weeds are of insufficient strength to avoid being carried to the ground, and the weeds are covered with earth and destroyed.

The improvement may be attached to the beams of any corn cultivator, without any alteration of the cultivator in itself.

I claim:

1. An attachment for cultivators, comprising a pair of brooms, a coil spring connected with each broom at one end of the spring, and adapted for connection with the beam of a cultivator at the other end, the brooms inclining inwardly, downwardly and rearwardly from the beam, to sweep the ground at each side of the row of plants and near the plants, for the purpose specified.

2. An attachment for cultivators, comprising a broom having a handle, a bar, and a coil spring connecting the handle to one end of the bar, a pair of U-shaped clips for embracing a plow beam, said clips having registering openings in their opposite side walls below the beam, the bar having a series of openings at the end remote from the spring and adapted to register with the openings of one of the clips, and a bolt and nut connecting the bar to the clip, an inclined brace connected with the other clip at one end, and to the bar intermediate the ends of the bar.

3. An attachment for cultivators, comprising a broom having a handle, a bar for attachment to the cultivator beam, and a coil spring arranged between the handle and the bar and connecting the handle to the bar.

4. An attachment for cultivators, comprising a broom having a handle, a bar for attachment to the cultivator beam, a coil spring arranged between the handle and the bar and connecting the handle to the bar, and a brace arranged between the bar and the beam.

GUSTAVE L. MILLER.

Witnesses:
CHARLES G. DAVIS,
L. K. ELLSBERRY.

Copies of this patent may be obtained for five cents each, by addressing the "Commissioner of Patents, Washington, D. C."